(12) United States Patent
Chen et al.

(10) Patent No.: US 6,977,732 B2
(45) Date of Patent: Dec. 20, 2005

(54) MINIATURE THREE-DIMENSIONAL CONTOUR SCANNER

(75) Inventors: Liang-Chia Chen, Taipei (TW); Kuang-Chao Fan, Taipei (TW)

(73) Assignees: National Taiwan University, Taipei (TW); National Taipei University Technology, Taipei (TW)

( * ) Notice: Subject to any disclaimer, the term of this patent is extended or adjusted under 35 U.S.C. 154(b) by 263 days.

(21) Appl. No.: 10/327,971

(22) Filed: Dec. 26, 2002

(65) Prior Publication Data

US 2004/0125381 A1 Jul. 1, 2004

(51) Int. Cl.⁷ .......................... G01B 11/24; A61C 1/00
(52) U.S. Cl. ........................................ 356/603; 433/29
(58) Field of Search ................................ 356/601–605; 433/29

(56) References Cited

U.S. PATENT DOCUMENTS

| | | | | |
|---|---|---|---|---|
| 4,837,732 A | * | 6/1989 | Brandestini et al. | 356/604 |
| 4,952,149 A | * | 8/1990 | Duret et al. | 356/604 |
| 5,372,502 A | * | 12/1994 | Massen et al. | 433/215 |
| 5,953,137 A | | 9/1999 | Sirat et al. | |
| 6,040,910 A | * | 3/2000 | Wu et al. | 356/613 |
| 6,169,634 B1 | | 1/2001 | Sirat | |
| 6,373,561 B2 | | 4/2002 | Riegel | |
| 6,464,633 B1 | * | 10/2002 | Hosoda et al. | 600/178 |

* cited by examiner

Primary Examiner—Zandra V. Smith
(74) Attorney, Agent, or Firm—Birch, Stewart, Kolasch & Birch, LLP

(57) ABSTRACT

A miniature three-dimensional contour scanner is provided, which integrates the optical element and the set of optical lens of the optical projection module and the image capture module into a miniature measurement device. The device utilizes the optical fiber to guide in the light of outside light source and applies the digital micromirror device (DMD) chip to produce structured light pattern and project it onto the object's surface to be measured. The image sensor element is then used to capture the deformed structured fringe image, and by utilizing this information it is able to obtain the colored two-dimensional image and the three-dimensional contour size of the object. The miniature three-dimensional contour scanner can thus be applied in the measurement of miniature objects in the narrow space.

23 Claims, 2 Drawing Sheets

MINIATURE THREE-DIMENSIONAL CONTOUR SCANNER

BACKGROUND OF THE INVENTION

1. Field of the Invention

The present invention relates to a miniature three-dimensional contour scanner, which can be used in narrow space to perform non-contact measurements of the three-dimensional objects.

2. Description of the Prior Art

The non-contact three-dimensional contour measurement technology refers to the use of different methods to create a light source and project it onto the surface of the object, by means of the various light path principles and photo detector to catch the characteristic data of the object's surface. This technique can be roughly classified as the active type and passive type depending on the manner of light source projection.

With regard to the active type non-contact three-dimensional contour measurement techniques, the method is to project onto an object desired to be measured the specially designed structured light patterns, for example, light-dot-array, periodical sine waves, light beams, etc, or other meaningful patterns. And due to the variations of the curvature or depth of the object's surface contour, it will lead to the deformation of the structured fringe projected onto the surface of the object. Therefore, after capturing the images of the deformed patterns by utilizing appropriate method, the object's three-dimensional contour data can be analyzed based on the acquired information, and the analyzing principles include, for example, the triangulation measurement method and the phase shift interference method, etc. In addition, the passive type non-contact three-dimensional contour measurement technique refers to utilizing the optical image technique of capturing the required characteristic data of the object's surface under natural illumination.

In recent years, the research and development have been widely discussed concerning the three-dimensional contour size of the object captured at high speed and with the optical non-contact technique. Meanwhile, the various creative methods and patents are disclosed (for example, C, Zhang at el., U.S. Pat. No. 6,169,634; 5,953,137; 6,373,561, which have been incorporated herein for reference ). However, at present only few measuring tools are concerning particularly about the in s itu e nvironment of the three dimension space measurement, wherein the measurement is performed in a specifically narrow space (for example, in the system configuration body or in the mouth cavity of human body). The size and volume of the three-dimensional scanners presently available on market are too excessively voluminous, and it is not suitable for being used directly in the non-contact precision three-dimensional contour scanning in the narrow space.

The CEREC system (as disclosed per U.S. Pat. No. 6,263,234)is one of a few three dimension tooth-form scanning measurement system presently in the world performed in the cavity of the mouth. It utilizes the grating pattern structured light of the infra-red ray (invisible light) , projecting upon the tooth-form to be measured in the cavity of mouth by four light grating movements (the amount per movement is ¼ grating pitch interval). The camera of the system takes pictures every ¼ interval, and calculate the phase shifting differences based on the relations between the depth of the object to be measured and the fringe image deformation amount so as to obtain the three-dimensional size. Since the projection fringes of the system are fixed, therefore its measurement accuracy and scope are apt to be restricted concerning the measurement of the curve-surfaced object containing stepped surface.

Besides, other measurement systems generate light grating fringes using the computer LCD projection method, and it can simultaneously generate arbitrary grating fringes patterns of a plurality of sets of different colors, which is superior to the ordinary fixed projection light grating fringes and has designable structured light fringe patterns and uniform projection effect. But the quality of the projection light grating fringes of liquid crystal display projection method is not the best, and the size of LCD is too large to be integrated easily into the miniature three-dimensional probe.

SUMMARY OF THE INVENTION

In view of the above reasons, the applicants have tried their utmost, and dedicated their efforts, ingenuity and many years experience in this field to the related research, which leads to the creation of the present invention. Therefore, the present case is to provide a miniature three-dimensional contour scanner, using the miniature light projection element and the surface structured light measuring technology to design a miniature three-dimensional contour scanning measurement system. The measurement system of the present invention can be applied in the narrow space measurement environment, and can output the colored two-dimensional image and the three-dimensional contour of the object to be measured and is a widely used tool incorporating the two dimension and three dimension measurements.

Thus, the purpose of the present invention is to provide a miniature three-dimensional contour scanner, which incorporates the optical elements and the optical lens set of the optical projection module and image capture module in a miniature measurement device. After using optical fiber to guide in light from the external light source, the DMD (Digital Micromirror Device) chip can generate structured light pattern and project it on the object's surface to be measured. Then it utilizes the image sensing element to capture the deformed structured fringe image, and it can obtain the colored two-dimensional image and the three-dimensional contour by using this information.

Furthermore, another purpose of the present invention is to provide a miniature three-dimensional contour scanning method, with which it can conduct the non-contact three-dimensional measurement of the object in the narrow measuring space.

To achieve the above purpose, the present invention is realized by: a miniature three-dimensional contour scanner comprising the following system modules:

optical projection modules: composed of the set of optical lens and digital micromirror device (DMD) chip, by using optical fiber to guide in the light of the external light source, the light passes through the set of the optical lens to a digital micromirror device chip, which can produce structured light pattern, and this pattern can be projected onto the object to be measured through the set of optical lens;

image capture module: mainly composed of a set of optical lens and image sensing element, which by means of the set of optical lens the deformed structured fringe image from the object's surface to be measured and its two-dimensional profile image can be captured by the image sensing element (CCD), which can output the image information to the main control module; and main control module:
  connected to the optical projection module and the image capture module, it is used to adjust and control the structured light pattern output of the optical projection module and process the image information obtained by the image capture module.

In addition, the present invention is realized by a miniature three-dimensional contour scanning method comprising the following three steps:

optical projection step: guiding in the light of the external light source through the optical fiber, the light passes through the set of optical lens to a digital micromirror device chip, which can generate structured light pattern and then the said pattern passes through the set of optical lens and projects onto the object to be measured;

image capture step:
by means of the set of optical lens the deformed structured fringe image from the object's surface to be measured and its two-dimensional profile image can be captured by the image sensing element (CCD), which can output the image information to the main control module; and main control step:
which is used to adjust and control the structured light pattern output of the optical projection module and to process the image information obtained by the image capture module.

Other features, objects and advantages of the present invention will become apparent on reading the following description of the embodiment given with reference to the accompanying drawings.

BRIEF DESCRIPTION OF THE DRAWINGS

The structure and technical means adopted by the present invention achieve the measurement performance described in the previous section and the objects can be best understood by referring to the following detailed description of the preferred embodiments and the accompanying drawings, wherein.

DETAILED DESCRIPTION OF THE PREFERRED EMBODIMENTS

In the present invention, the optical projection element adopts digital micromirror device (DMD) chip as the structured fringe generator and projector, and it utilizes the following four characteristics of DMD:

1. Square-shaped thin chip (diagonal length 17.8 mm) which can easily be incorporated in the miniature scanner.

2. Precise fringes (line resolution, straight line linearity and image contrast), which is superior to that of the liquid crystal display, and it can effectively raise the measurement precision of the scanner.

3. Variable fringe patterns, with which the image RGB gray levels can be arbitrarily designed by the computer program. Therefore, any arbitrary structured light patterns can be generated and projected freely, thereby increasing the flexibility of three dimension contour measurement and computation methods.

4. Fast response, by which the DMD can accomplish the single structured light pattern projection in $3.33 \times 10^{-3}$ sec, theoretically, so that the three-dimensional contour measurement speed can reach the frequency of 300 Hz, and it can perform the quasi-dynamic three-dimensional measurement of the object.

Besides, compared with the liquid crystal display, DMD can project more precise structured fringe pattern. If adopting the DMD miniature element, then the volume of the scanner probe can be limited into the range of 30 mm (W)×30 mm (H)×150 mm (L) ,so as to form a miniature three-dimensional contour scanner.

IMAGE CAPTURE ELEMENT

In the preferred embodiment of the present invention, the image capture element makes use of the two-dimensional color display image sensor element (RGB color CCD), which can provide the two dimension image output in colors. The image information can be utilized in the data registration of a plurality of three-dimensional contour images, and in the color-adhesion application of the three-dimensional object model.

MINIATURE THREE-DIMENSIOANL CONTOUR SCANNER

Figure 1:
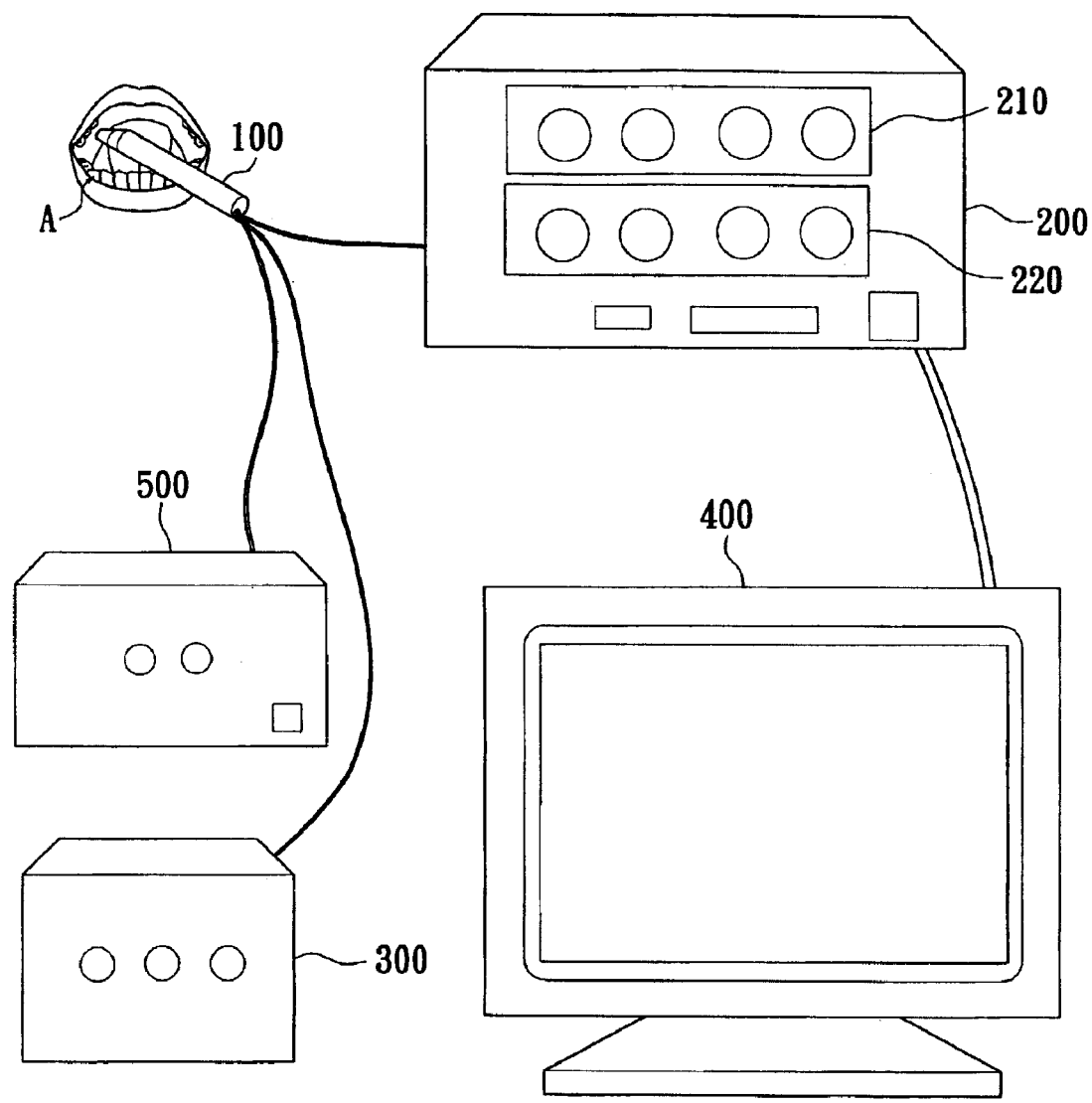
FIG. 1 is the schematic diagram of the miniature three-dimensional contour scanner according to this invention.
Figure 2:
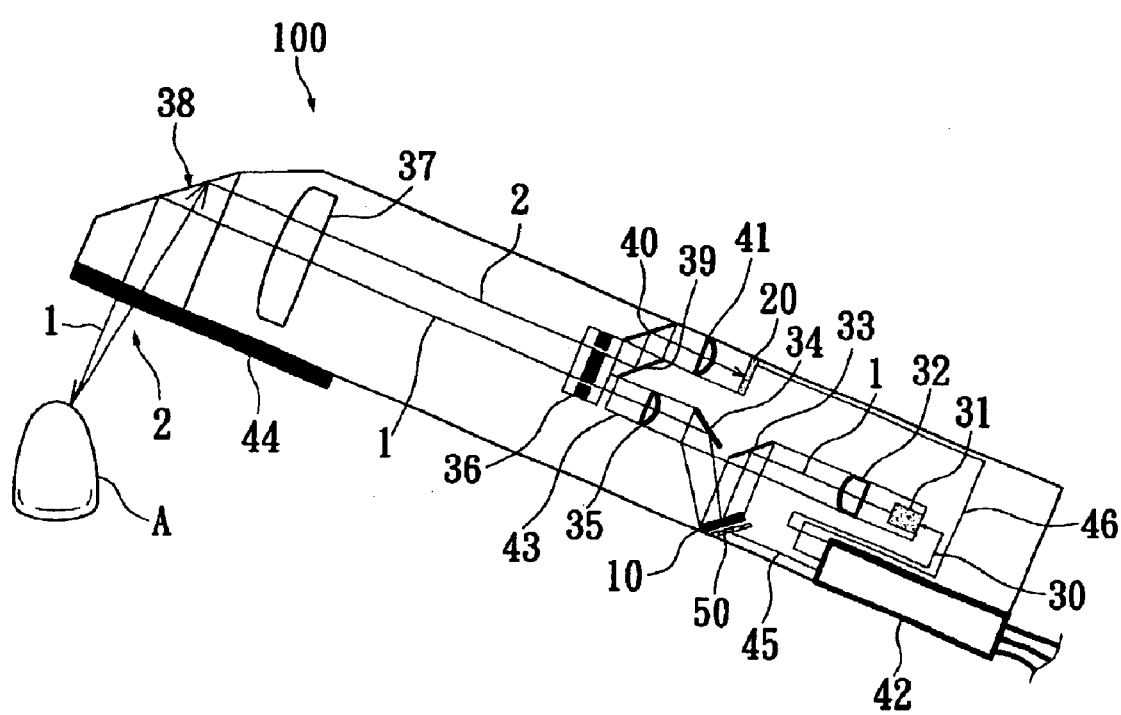
FIG. 2 is the schematic diagram of the miniature measurement main body of the three-dimensional contour scanner according to this invention.

Please refer to FIG. 1, which shows the device diagram of the embodiment of the present invention. It comprises a miniature measurement main body 100(as shown in FIG. 2) and a main control module 200, wherein, optical elements, optical lenses of the optical projection module, and the image capture module are provided in miniature measurement main body 100; and the main control module 200 is composed of the image processing module 210 and the digital micromirror device chip control module 220. Besides, the present device can be connected to the external light source device 300, display device 400 and electrical power supply 500, which are used to guide in the light of the external light source, output image result, and input power supply respectively.

In the optical system of the miniature measurement main body 100, the projection light source 1 is provided by an external light source device 300. In the present embodiment it is a halogen light source (a DC regulated illuminator), the light of which passes through optical fiber 30 and light gathering lens 31 with an appropriate size and is provided to the inside of miniature measurement main body 100. The light from the projection light source 1 is first collimated by the optical collimating lens 32. It passes through the 45° optical reflection mirror 33 and is projected onto DMD at 20° with the orthogonal direction of DMD 10 (the fixed projection angle of DMD) , wherein, DMD can adjust and control the generation of arbitrary structure light patterns required for measurement through the digital micromirror device chip control module 220 of the main control module 200. And the structured light of the light source reflected by the DMD surface, after passing through the optical reflection mirror 34, optical focusing lens 35, optical aperture 36, optical collimating lens 37, and 45° optical reflection mirror 38, is projected onto the 3D object contour A of the object to be measured. The deformed structured fringe patterns 2 , formed by the structured light of the projection light source 1 and 3-D object contour A(concave convex variation, then pass through 45° optical reflection mirror 38, optical collimating lens 37, optical aperture 36, two 45° optical reflection mirror 39, 40 and optical focusing lens 41, and form images on the color image display sensor element 20. The image capturing and processing are performed by the image processing module 210 of the main control module 200, and the color object image results are outputted through the display device 400 (for example, outputted to the color image display).

The miniature measurement main body 100 is connected to a power supply 500 and a main control module 200 through the power supply and signal connector 42, and by means of the configuration of optical member support structure 43, measurement fixing support plate 44 and the housing to combine with the optical projection module and image capture module (the detailed construction is not shown in the drawing). And the power supply and signal connector 42 are connected to DMD and RGB CCD through the power supply and signals 45 and 46 respectively.

In addition, the appropriateness of the heat dissipation design will directly influence the function and reliability of the optical system; therefore the design of heat dissipation is extremely important. In the equipment of the present invention, DMD is the key point area in the probe which needs heat dissipation (must be maintained under 40° C) most. The ordinary projectors adopt the electric fan for cooling; however the electric fan is not suitable for the present case, since the volume of the scanner is small and its space is severely restricted. Therefore, the present design adopts the heat pipe 50. It achieves the purpose of heat dissipation in the small narrow space through the three steps of vaporization, adiabatic process and condensation.

Summing up the above, the present invention makes use of the structured light (a halogen lamp light source projecting through the digital micromirror device chip the structured light patterns used for measurement, such as the various types of periodic sine waves, concentric circles or dot matrix patterns, projecting the structured light at an inclination angle on the object's surface to be measured. Therefore, it can utilize DMD's projection characteristics of high speed and high precision concerning the projection of the surface structured light. It can also use phase shifting measurement method (requiring several phase-shifted fringe patterns) or triangulation measurement method (only requiring single structured light pattern) to calculate the three-dimensional contour size of the object to be measured, so as to form the miniature three-dimensional contour probe and measurement system of small volume and light weight. In addition, the present invention achieves the purpose of being able to perform three-dimensional contour measurement of the object inside the narrow space, through integrating the optical projection module and the image capture module into a miniature measurement main body.

Though the present invention is described above with a preferred embodiment, but it should not restrict the scope of applications of the present invention. Those who are familiar with the art cannot make various revisions and modification not departing from the spirit and the scope of the present invention, namely, any equivalent variations or modifications made according to this invention should be covered by the claims, and its definition should be based on the appended claims.

What is claimed is:

1. A miniature three-dimensional contour scanner, comprising:

an optical projection module, including a set of optical lens and a digital micromirror device (DMD) chip, by using optical fiber to guide light of an external light source, the light passing through the set of the optical lens to the digital micromirror device chip and being reflected by the digital micromirror device chip, thereby producing structured light patterns, the structured light patterns being projected onto an object by way of the set of optical lens;

an image capture module, including the set of optical lens and an image sensing element, the set of optical lens capturing deformed structured fringe images and two-dimensional images from a surface of the object to the image sensing element, which outputs the deformed structured fringe images and the two-dimensional images; and a main control module, connected to the optical projection module and the image capture module for receiving the deformed structured fringe images and the two-dimensional images, adjusting the structured light pattern.

2. The miniature three-dimensional contour scanner as claimed by claim 1, wherein further comprises a display device, the dislay device outputting the image processing results of the main control module.

3. The miniature three-dimensional contour scanner as claimed in claim 1, wherein further comprises an external light source device, the external light source device providing the external light sources.

4. The miniature three-dimensional contour scanner as claimed in claim 3, wherein the external light source device is a halogen light source.

5. The miniature three-dimensional contour scanner as claimed in claim 1, wherein the main control module comprising:

an image processing module, used in the operation of image capture control, image processing and three-dimensional contour calculation; and a digital micromirror device chip control module, to adjust and control the digital micromirror device chip, by means of a calculator and a digital micromirror device chip controller, so as to produce the structure light patterns.

6. The miniature three-dimensional contour scanner as claimed in claim 1, wherein the image sensing element of the image capture module is the CCD color image display sensing element.

7. The miniature three-dimensional contour scanner as claimed in claim 1, wherein the set of optical—lens is composed of at least one of the following items: optical collimating lens, optical reflection mirror, optical light gathering lens, optical focusing lens, and optical aperture.

8. The miniature three-dimensional contour scanner as claimed in claim 7, wherein incident light of the external light source of the optical projection module passes through the following items in order: the optical light gathering lens, optical collimating lens, 45° optical reflection mirror, digital micromirror device chip, 45° optical reflection mirror, optical focusing lens, optical aperture, optical collimating lens, and 45° optical reflection mirror.

9. The miniature three-dimensional contour scanner as claimed in claim 7, wherein the deformed structured fringe images and the two-dimensional images of the image capture module passes through the following items in order: the 45° optical reflection mirror, optical collimating lens, optical aperture, 45° optical reflection mirror, optical collimating lens and image sensing element.

10. The miniature three-dimensional contour scanner as claimed in claim 1, wherein the miniature measurement main body further comprises a heat dissipation element used to cool the digital micromirror device chip.

11. The miniature three-dimensional contour scanner as claimed in claim 1, wherein the heat dissipation element is the heat pipe.

12. The miniature three-dimensional contour scanner as claimed in claim 1, wherein the structured light patterns are of any one of light dot arrays, periodic sine waves, light beams and concentric circles.

13. A miniature three-dimensional contour scanning method, comprising following steps:

an optical projection step: guiding light of an external light source through optical fiber, the light passing through a set of optical lens to a digital micromirror device chip and being reflected by the digital micromirror device chip, to generate structured light patterns, and then the structured light patterns passing through the set of optical lens and being projected onto an object;

an image capture step: using the set of optical lens to capture deformed structured fringe images and two-dimensional images from the object and the deformed structured fringe images and the two-dimensional images being sent to an image sensing element, which records and sends the deformed structured fringe images and two-dimensional images a main control module; and a main control step: to adjust and control the structured light patterns output from the optical projection module, and to process image information obtained by an image capture module.

14. The miniature three-dimensional contour scanning method as claimed in claim 13, wherein further comprises a display step used to output image processing results of the main control module.

15. The miniature three-dimensional contour scanning method as claimed in claim 13, wherein the main control step comprises:

an image processing process: to perform operations of image capture control, image processing, and three-dimensional contour calculation; and a digital micromirror device chip control process:

to perform adjustment and control of the digital micromirror device chip, by means of a calculator and a digital micromirror device chip controller so as to produce the structured light patterns.

16. The miniature three-dimensional contour scanning method as claimed in claim 15, wherein-the image processing process utilizes a phase shifting method to determine three-dimensional contour sizes of the object.

17. The miniature three-dimensional contour scanning method as claimed in claim 15, wherein -the image processing process utilizes a triangulation measurement method to determine three-dimensional contour sizes of the object.

18. The miniature three-dimensional contour scanning method as claimed in claim 13,wherein -the image capture step utilizes a CCD color image display sensor element as the image sensing element.

19. The miniature three-dimensional contour scanning method as claimed in claim 13, wherein—the optical projection step and image capture step utilizes more than one of the following items to form the set of optical lens: optical collimating lens, optical reflection mirror, optical light gathering lens, optical focusing lens and optical aperture.

20. The miniature three-dimensional contour scanning method as claimed in claim 19, wherein—incident light of the external light source of the optical projection step passes through the following items in order: optical light gathering lens, optical collimating lens, 45° optical reflection mirror, digital micromirror device chip, 45° optical reflection mirror, optical focusing lens, optical aperture, optical collimating lens and 45° optical reflection mirror.

21. The miniature three-dimensional contour scanning method as claimed in claim 19, wherein—the deformed structured fringe images and the two-dimensional images of the image capture step passes through the following items in order:- the 45° optical reflection mirror, optical collimating lens, optical aperture, 45° optical reflection mirror, optical collimating lens and image sensing element.

22. The miniature three-dimensional contour scanning method as claimed in claim 13, wherein—a heat dissipation element is to cool down the digital micromirror device chip.

23. The miniature three-dimensional contour scanning method as claimed in claim 13, wherein—the structured light patterns are any one of the light dot arrays, periodic sine waves, light beams and concentric circles.

* * * * *